Nov. 20, 1951   J. W. HUFF   2,575,450
APPARATUS FOR CUTTING STRIP MATERIAL
Filed Oct. 2, 1946   2 SHEETS—SHEET 2
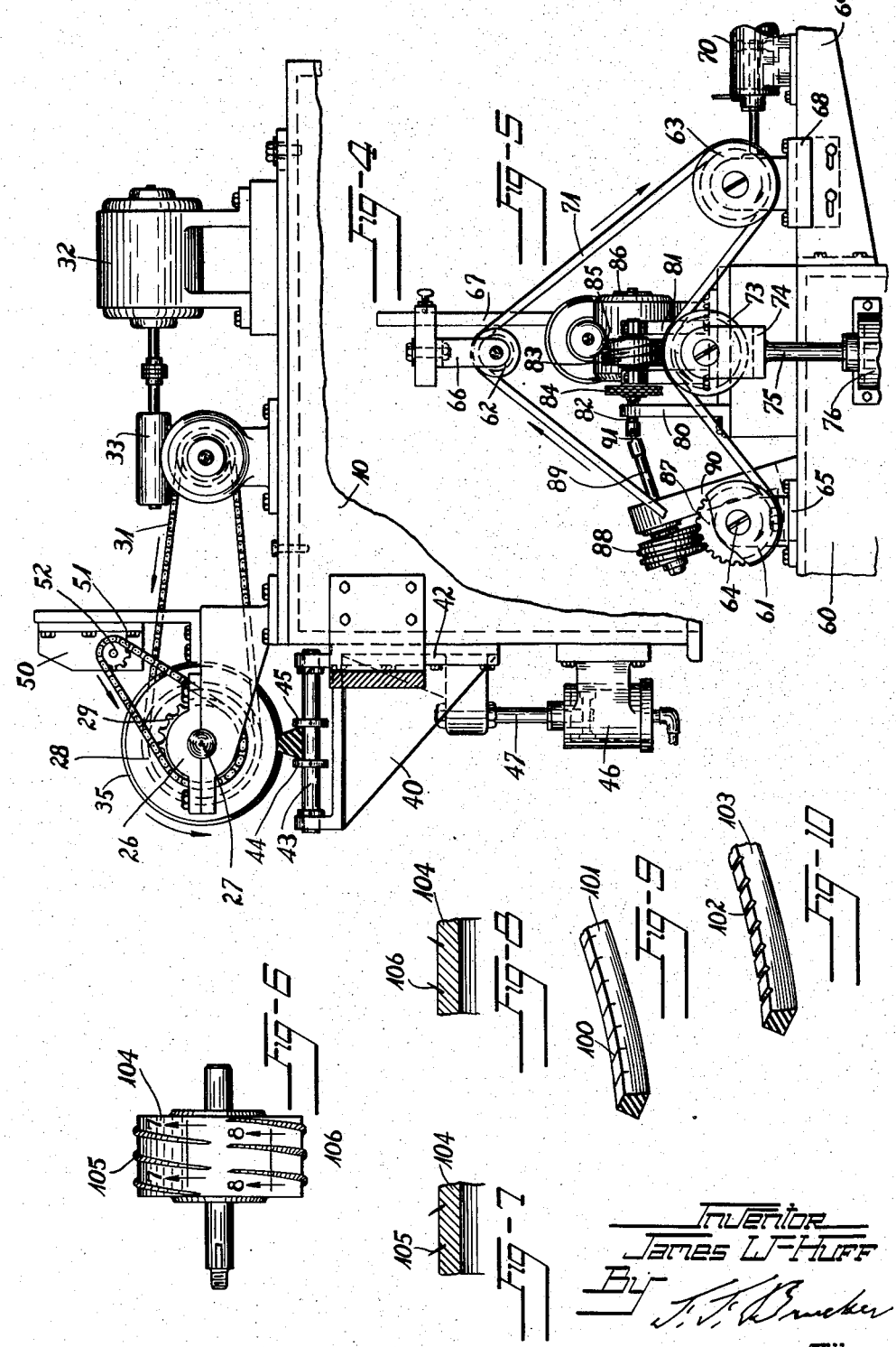
Inventor
James W. Huff
By
Att'y Patented Nov. 20, 1951

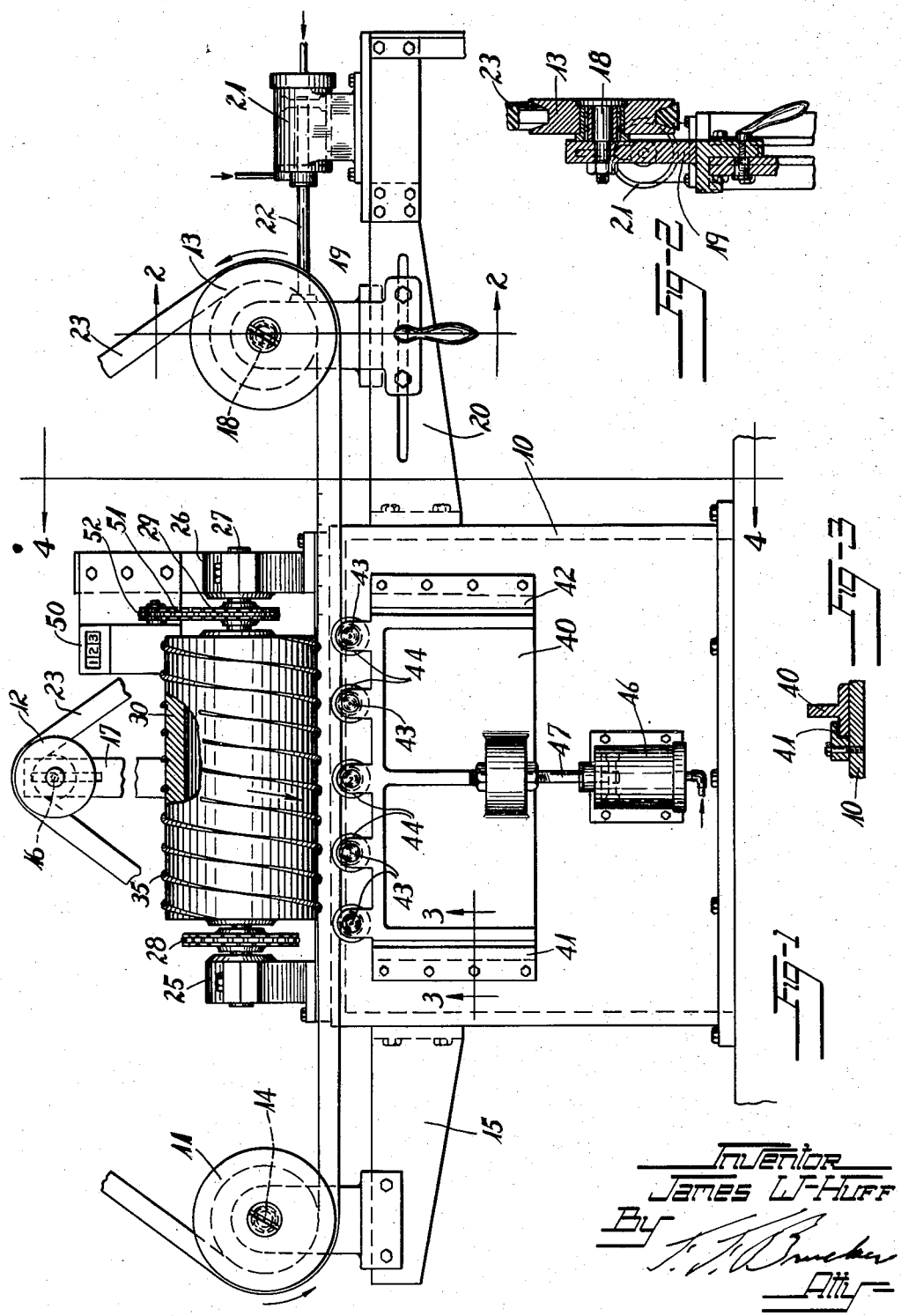

2,575,450

UNITED STATES PATENT OFFICE 2,575,450

APPARATUS FOR CUTTING STRIP MATERIAL

James W. Huff, Akron, Ohio, assignor to The B. F. Goodrich Company, New York, N. Y., a corporation of New York Application October 2, 1946, Serial No. 700,753

4 Claims. (Cl. 164—64)

This invention relates to apparatus for cutting and notching strip material such as belts, or other bands which may be in endless form and the invention is especially useful in the cutting of transverse slits or notches along the pulley side of V-belts.

In the manufacture of V-belts of fabric or cord and rubber or other rubber-like material, the cutting of slits or notches in the pulley side of the belt and extending transversely thereof has the advantage of making the belt more flexible and decreasing internal friction, thereby prolonging the life of the belt.

It is an object of the present invention to provide for cutting slits or notches in belts or bands and to facilitate such cutting in bands of endless form.

Other objects are to provide for cutting such belts progressively with a minimum of physical effort, to provide for continuous cutting and simultaneous advance of the belt, to provide for cutting slits at an angle acute to a face of the belt, to provide for notching the belts by successive cuts of opposite angularity, to provide simultaneous power-driven advance of the belt with synchronous cutting thereof, and to provide a uniform product.

These and other objects will appear from the following description and the accompanying drawings.

Of the drawings,

Fig. 1 is a front elevation of apparatus constructed in accordance with and embodying the invention, parts being broken away.

Fig. 2 is a cross sectional view thereof, taken on line 2—2 of Fig. 1.

Fig. 3 is a cross sectional view taken on line 3—3 of Fig. 1.

Fig. 4 is a sectional view thereof taken on line 4—4 of Fig. 1.

Fig. 5 is a front elevation of another embodiment of the invention.

Fig. 6 is a front elevation of a modification of the cutter head of Fig. 5.

Fig. 7 is a cross-sectional view taken on line 7—7 of Fig. 6.

Fig. 8 is a similar view taken on line 8—8 of Fig. 6.

Fig. 9 is a perspective view of a portion of a V-belt having lateral slits as cut by the apparatus of Figs. 1 to 5.

Fig. 10 is a similar view of a portion of a V-belt having lateral notches as cut by the cutter of Figs. 6 to 8.

Referring to the drawings, and first to the embodiment of Figs. 1 to 4 thereof, the numeral 10 designates the frame of the apparatus which supports three V-grooved pulleys 11, 12, 13 arranged on parallel axes in the form of a triangle. Pulley 11 is freely rotatable about its shaft 14 which is supported by a bracket 15 mounted on the frame 10. Pulley 12 is freely rotatable about its shaft 16 fixed to a standard 17 supported by the frame 10. Pulley 13 is also freely rotatable about its shaft 18 which is fixed to a carriage 19 slideably mounted on a bracket 20 fixed to frame 10. A fluid-pressure operated cylinder 21 is secured to the bracket 20 and its piston rod 22 is secured to carriage 19. The arrangement is such that when the piston rod is moved to the left in Fig. 1, the V-belt 23 about pulleys 11, 12, 13 is tensioned, and when the piston rod is moved to the right, tension is relieved so that the belt may be removed. The standard 17 is preferably adjustable vertically of the frame 10 to adjust the apparatus to belts of different circumference.

Also mounted on the frame 10 are a pair of pedestal bearings 25, 26 which rotatably support a shaft 27 with its axis parallel to the reach of belt between pulleys 11 and 13. The shaft 27 has fixed thereto a sprocket 28, a sprocket 29 and a cutter head 30. Sprocket 28 is driven by a chain 31 from a motor 32 through a speed reducer 33.

The cutter head 30 is provided with an upstanding knife blade 35 secured thereabout in a helical path, the pitch of the convolutions of the blade being equal to the desired spacing of slits in the belt.

For supporting the horizontal reach of the belt and pressing it against the cutter blade, a carriage 40 is vertically guided for sliding movement with respect to frame 10 by rails 41, 42. A plurality of free-running guide rollers 43 are rotatably mounted on carriage 40 and have flanges 44, 45 for supporting the belt laterally. A fluid-pressure operated cylinder 46 is fixed to the frame 10 and its piston rod 47 is secured to the carriage. The arrangement is such that when air under pressure is supplied to the lower end of cylinder 46, the carriage 40 is raised and the belt is pressed into engagement with the knife blade 35.

For recording the revolutions of the cutter head a revolution counter 50 is mounted on the frame 10 and is driven by a chain 51 and sprocket 52 from sprocket 29. The revolution counter is preferably of the type which makes an electrical contact after a desired number of revolutions and its circuit is arranged to stop the motor 32 after the desired number of slits has been cut in the belt.

The operation of the apparatus is as follows: Air is admitted to the right end of cylinder 21 as seen in Fig. 1, and cylinder 46, which is a single-acting cylinder, is connected to exhaust to lower carriage 40. A belt is then placed about pulleys 11, 12 and 13 and air is admitted to the left end of cylinder 21 to tension the belt thereabout. Air is then admitted to cylinder 46 to raise carriage 40 and force the horizontal reach of the belt against the cutting knife and, at the same time, the motor 32 is started to cause the cutter head 30 to rotate in a counterclockwise direction as seen when looking from the right of Fig. 1. As the cutter head rotates it cuts spaced-apart lateral slits in the belt and by the engagement of the knife in the slits advances the belt to the right as seen in Fig. 1, about pulleys 11, 12, 13. When the last cut is made, the counter 50 makes an electrical contact which stops the motor 32. The carriage 40 is then lowered and tension on the belt is released and the belt removed. In this form of the invention the helical knife engages in the material of the belt and advances the belt automatically as it cuts successive lateral slits in the belt. While means has been described for supporting an endless belt, extensive strip material such as a continuous strip of belting may be slit by placing it between the cutter 3 and the support 40 as the cutter feeds the strip regardless of tension on the strip.

Referring to Fig. 5 of the drawing, a frame 60 supports V-grooved belt pulleys 61, 62, 63. Pulley 61 is rotatably mounted about a shaft 64 fixed to a bracket 65 secured to the frame. Pulley 62 is mounted for free rotation in a bracket 66 adjustably supported on a standard 67 fixed to frame 60 for vertical adjustment. Pulley 63 is rotatably mounted on a carriage 68 slideably mounted on a bracket 69 secured to the frame 60. A fluid-pressure operated cylinder 70 is fixed to bracket 69 and its piston is secured to carriage 68 for moving it to tension the belt 71.

For supporting the belt at the cutting position, a fourth pulley 73 is provided. It is mounted for free rotation on a yoke 74 fixed to the piston rod 75 of a cylinder 76. The cylinder 76 is fixed to the frame 60 and is operated by fluid pressure to raise and lower the pulley 73. The pulley 73 has a flat bottomed groove equal in width to the back face of the belt and located between side flanges for supporting the sides of the belt. For cutting slits in the belt, a pair of pedestals 80, 81 are fixed to the frame 60 and rotatably support a shaft 82 journaled therein. The shaft 82 has a cutter head 83 and a sprocket 84 fixed thereto. A knife blade 85 is secured about the cutter head along a helical path in a position to engage the belt where it is supported by the pulley 73. A motor 86 drives the shaft 82 through the sprocket 84 and a chain drive.

For advancing the belt as it is cut, a worm gear 87 is fixed to pulley 61 and is engaged by a worm 88 secured to a shaft 89. Shaft 89 has a bearing in a pedestal 90 secured to frame 60 and is driven by shaft 92 through a universal coupling 91. The arrangement is such that the belt 71 is advanced past the cutter head 85 at each revolution of the cutter head by an amount equal to the pitch of the helical knife blade, thereby relieving the knife blade of the friction resulting from advance of the belt.

With this form of apparatus the knife blade may extend radially to form lateral slits in the belt such as the slits 100 in the belt 101 of Fig. 9. To provide for cutting notches such as the notches 102 of the belt 103 of Fig. 10 a cutter head 104, illustrated in Figs. 6 to 8, may be substituted for the cutter head 85 of Fig. 5. This cutter head has a plurality of blades mounted about its periphery. The blades 105 are inclined to the left, as in Fig. 7 and extend through a semi-circumference of the cutter head along a helical path. The blades 106 are inclined in the opposite direction as shown in Fig. 8 and extend about the cutter head along a helical path in the opposite semi-circumference of the cutter head, the blades being arranged to make successive oppositely inclined intersecting cuts across the belt, thereby cutting V-shaped cross grooves in the belt. At each revolution of the cutter head a notch is completed and the material between the oppositely inclined cuts drops from the belt.

In the operation of the apparatus of Figs. 5 to 8 inclusive, compressed air or other fluid is admitted to the right end of the cylinder 70 to move pulley 63 toward pulley 61 and fluid pressure is exhausted from cylinder 75 to lower pulley 73. A belt 71 is then placed about the pulleys 61, 62, 63, the pulley 62 being adjusted to the belt to be cut. Fluid is then admitted to the left end of cylinder 70 to move pulley 63 to the left to tension the belt 70 and fluid pressure is admitted to cylinder 75 to raise pulley 73 and with it the lower reach of the belt into engagement with the knives on the cutter head 85. The motor 86 is then started and the cutter head rotates and cuts successive cuts or notches in the belt laterally thereof as the belt is advanced circumferentially. This form of apparatus may be equipped with a motor controlling counter as in the apparatus of Fig. 1 or the motor may be stopped by control of the operator.

Variations may be made without departing from the scope of the invention as it is defined by the following claims.

I claim:

1. Apparatus for cutting lateral notches in an endless belt of flexible strip material while the belt is supported under tension, said apparatus comprising means for tensioning a reach of the strip material, means for supporting one face of the tensioned reach against deflection by direct contact therewith, notching means comprising a rotatable cutter having a helical blade located opposite said supporting means with its blade in position to cut partially through the tensioned reach, and means for rotating said cutter to cut notches partially through said strip and to simultaneously advance the strip past said support by engagement of the helical cutter therewith.

2. Apparatus for cutting lateral notches in an endless belt of flexible strip material while the belt is supported under tension, said apparatus comprising means for tensioning a reach of the strip material, roller means engageable with a face of the strip at said reach for supporting the strip against deflection by direct contact therewith, notching means comprising a rotatable cutter having a helical blade located opposite said roller means with its blade in position to cut partially through the tensioned reach of the strip, means for adjusting said roller means toward and away from the strip, and means for rotating said cutter to cut notches partially through said strip and simultaneously to advance the strip past said roller means by engagement of the helical cutter therewith.

3. Apparatus for cutting lateral notches in an endless belt while the belt is supported under tension, said apparatus comprising a set of pulleys for engaging said belt, means for moving one of said pulleys to tension a reach of the belt, roller means engageable with a face of said reach of the belt for supporting the reach against deflection by direct contact therewith, notching means comprising a rotatable cutter having a helical blade located opposite said roller means with its blade in position to cut partially through the tensioned reach of the belt, and means for rotating said cutter to cut notches partially through said belt and simultaneously to advance the belt past said roller means by engagement of the helical cutter therewith.

4. Apparatus for cutting lateral notches in an endless belt while the belt is supported under tension, said apparatus comprising a set of pulleys for engaging said belt, means for moving one of said pulleys to tension a reach of the belt, roller means engageable with a face of said reach of the belt for supporting the reach against deflection by direct contact therewith, notching means comprising a rotatable cutter having a helical blade located opposite said roller means with its blade in position to cut partially through the tensioned reach of the belt, means for adjusting said roller means toward and from said rotatable cutter to position a reach of the belt for cutting, and means for rotating said cutter to cut notches partially through said belt and simultaneously to advance the belt past said roller means by engagement of the helical cutter therewith.

JAMES W. HUFF.

REFERENCES CITED

The following references are of record in the file of this patent:

UNITED STATES PATENTS

| Number | Name | Date |
|---|---|---|
| 737,430 | Lyon | Aug. 25, 1903 |
| 1,498,935 | Shull | June 24, 1924 |
| 1,510,729 | Weisner | Oct. 7, 1924 |
| 1,577,621 | Gammeter | Mar. 23, 1926 |
| 1,580,916 | Putt | Apr. 13, 1926 |
| 1,673,219 | Andrews | June 12, 1928 |
| 1,676,011 | Evans | July 3, 1928 |
| 1,958,122 | Ambler | May 8, 1934 |

FOREIGN PATENTS

| Number | Country | Date |
|---|---|---|
| 65,501 | Norway | Sept. 1, 1947 |